Feb. 25, 1969 E. MACHON 3,429,455
MANIPULATORS
Filed March 28, 1966

INVENTOR
Edward Machon
BY
ATTORNEY

United States Patent Office 3,429,455
Patented Feb. 25, 1969

3,429,455
MANIPULATORS
Edward Machon, Sheffield, England, assignor to Davy and United Engineering Company Limited, Sheffield, England
Filed Mar. 28, 1966, Ser. No. 538,079
Claims priority, application Great Britain, Apr. 1, 1965, 13,887/65
U.S. Cl. 214—1                    2 Claims
Int. Cl. B25j 5/00; B66c 17/18

ABSTRACT OF THE DISCLOSURE

The invention is concerned with a manipulator assembly comprising a peel mounted on a manipulator carriage. A pair of spring assemblies is arranged between the peel and the carriage, each comprising a pair of coaxial springs. In either direction of forging the carriage can continue its movement toward or away from the press whilst the peel is held stationary on its workpiece being gripped by the tools of the press. On release of the workpiece the spring loading operates to return the peel to a datum position on the manipulator. One of the springs remains uncompressed for a predetermined distance when the peel moves away relative to the datum position.

---

This invention relates to forging manipulators.

In order that a forging manipulator need not be stopped and restarted for each press stroke the peel of the manipulator is normally mounted on the main manipulator carriage for movement relative thereto in either direction of forging, that is towards or away from the press, so that when the workpiece carried by the peel is gripped by the press tools the manipulator carriage is free to move; means must then be provided for restoring the peel and workpiece to their original position relative to the manipulator between press strokes.

According to the present invention a manipulator assembly, in which a manipulator carriage has a peel mounted thereon for movement from a datum position relative thereto includes a pair of spring assemblies arranged externally of the peel shaft and connected between the peel and the manipulator carriage, so as to restore the peel to the datum position after relative movement in either direction of forging.

Preferably each spring assembly includes a plurality of springs arranged coaxially within one another, one of which springs may remain uncompressed until the peel has moved through a predetermined distance from the datum position.

In a preferred form the rear end of the peel is mounted on trunnions for rotation about a horizontal axis and the spring assemblies are arranged to rotate with the peel about this axis. By arranging a pair of spring assemblies externally of the peel shaft greater spring loads are possible and maintenance is facilitated.

In a preferred embodiment each spring assembly comprises a rod fast with one of the peel and manipulator carriage and slidable in a housing fast with the other of the peel and manipulator carriage, a first spring in compression between first and second members each of which is arranged to move with the roll towards the other member in one direction of forging from the datum position but is held against movement in the other direction of forging by the housing, and a second spring held between third and fourth members slidable on the rod in opposite directions from the datum position and arranged to abut fixed members on the rod so that the second spring remains uncompressed until the peel has moved through the said predetermined distance from the datum position.

Figure 1:
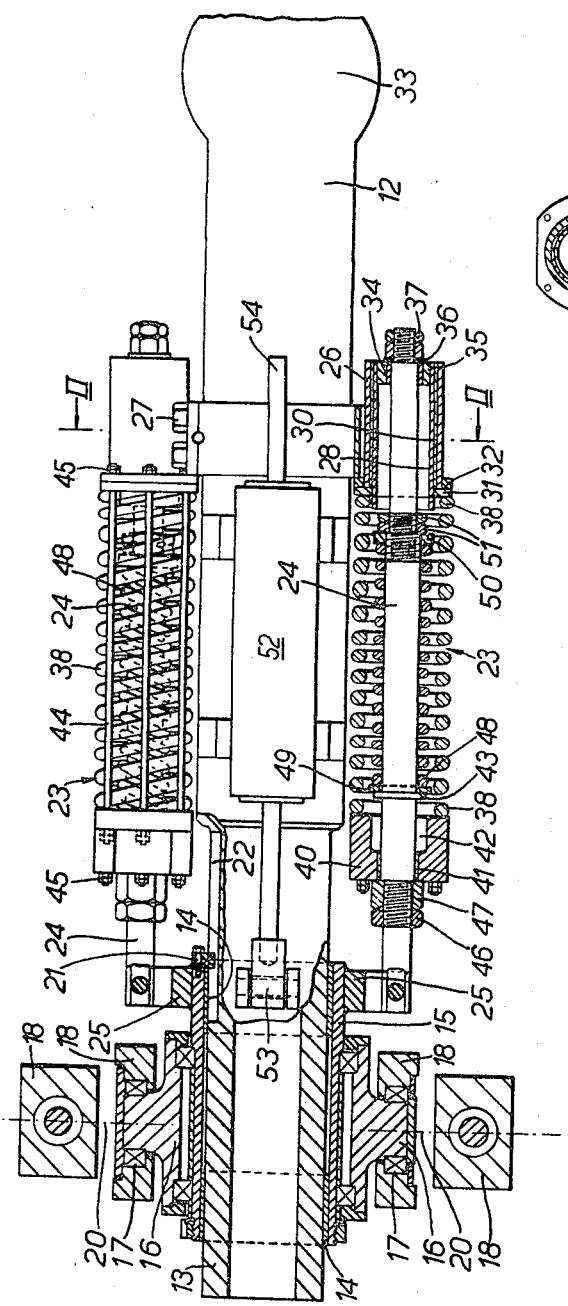
Figure 2:
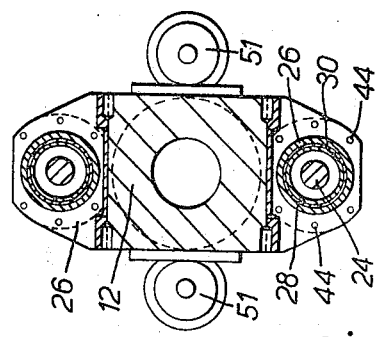

One embodiment of a manipulator assembly, in accordance with the invention, will now be described, by way of example only, with reference to the drawings accompanying the provisional specification, of which:

FIGURE 1 is a horizontal section through a manipulator peel assembly, and
FIGURE 2 is a section on the line II—II of FIGURE 1.

A manipulator peel 12 has the rear end 13 of its shaft slidably supported in bushes 14 in a housing 15. The housing 15 carries trunnions 16 which are rotatably mounted in bearings 17 of the manipulator carriage 18 for rotation about a horizontal axis 20. A key 21 secured to the housing 15 is slidable in a slot 22 in the peel shaft to limit the relative movement. A pair of spring assemblies 23 is arranged on opposite sides of the peel shaft in connection between the housing 15 and peel shaft. In FIGURE 1 the peel and manipulator carriage are shown in a datum position relative to one another, the peel being movable in either direction parallel to its axis, that is towards or away from the press, relative to the manipulator carriage and the spring assemblies 23 are arranged to restore the peel to this datum position after relative movement in either direction therefrom.

The spring assemblies are similar so that only one will be described. Each spring assembly comprises a rod 24 extending parallel to the peel shaft and having its rear end connected with an extension 25 of the housing 15. The forward end of the rod extends through a housing 26 secured to the peel by bolts 27. A sleeve 28 is slidably received within a bush 30 in the housing 26 and has an end plate 31 fast therewith which in the datum position illustrated contacts the housing at 32 preventing movement of the sleeve and end plate towards the head 33 of the peel, that is to the right in FIGURE 1. The end of the rod 24 is slidable within a further bush 34 mounted in an end piece 35 fast with the sleeve 28, and carries a washer 36 and nut 37 which in the datum position bear against the bush 34 and end piece 35 to prevent movement of the rod to the left in the figure relative to the sleeve 28. A main recoil spring 38 located around rod 24 in compression between the end plate 31 and an end plate 40 slidably mounted on the rod 24 through bush 41. The front of end plate 40 has a recess 42 capable of receiving an annular abutment 43 fast on the rod 24. The end plate 40 is secured against movement further away from the housing 26 than its datum position shown by a plurality of tie rods 44 which pass slidably through the end plate 40 and the flange of housing 26 and have bolts 45 at each end. Nuts 46, 47 are secured to the rear end of rod 24 to bear against the rear surface of the end plate 40. An auxiliary spring 48 mounted coaxially within spring 38 is held between washers 49, 50 slidably mounted on the rod 24 so that in the datum position the spring 48 holds them against abutment 43 and nuts 51 on the rod 24 respectively. The external diameter of washers 49, 50 exceeds the diameter of recess 42 and internal diameter of sleeve 28 respectively.

A pair of damping mechanisms 52 are secured at one end 53 to the housing 15 and the other end 54 to the peel shaft. These may be of any conventional form.

In operation, when the workpiece is held by the press tools so that the peel is stationary and the manipulator is forging towards the press, that is moving to the right in FIGURE 1, rods 24 move with the manipulator carriage, nuts 47 contact end plates 40 and drive them to the right compressing springs 38 against end plates 31; abutments 43 and washers 49, 50 move equally with their associated rods 24 until the washers 50 contact the sleeves 28 whereafter further movement of rods 24 compresses the auxiliary springs 48; finally when the peel is released springs 38 and 48 act on end plates 31 and drive the peel and workpiece to restore them to the datum position with the end plates 35 bearing against washers 36. When forging in the opposite direction, with the workpiece again held by the press tools away from the press, each rod 24 moves with the manipulator carriage, to the left in FIGURE 1, and nuts 37 and washers 36 bear against the end pieces 35 thus carrying the sleeves 28 and end plates 31 with the rods and compressing springs 38 between the end plates 31 and end plates 40 which are held against movement away from the peel by tie rods 44. When the springs 38 have been compressed through a predetermined distance the washers 49 engage end pieces 40 and the auxiliary springs 48 are compressed for the remainder of the travel of the manipulator. The total force stored up in the two pairs of springs is then sufficient to accelerate the peel back to the datum position when the peel is released with the end plates 40 bearing against the nuts 47 and the flanges of housing 26 bearing against the end plates 31. With for example, a ten metre ton manipulator the auxiliary springs may be arranged to remain uncompressed for the first four inches of travel and to be compressed only for the last inch of travel.

It will be seen that since the rear ends of rods 24 are secured to the forward end of the housing 15 of the spring assemblies 23 and the damping mechanism 52 rotate with the peel about the axes 20.

I claim:
1. A manipulator assembly for forging presses and the like, said assembly comprising a manipulator carriage, a peel comprising a shaft and supported on said carriage for movement longitudinally of said peel from a datum position relative to said carriage, and a pair of spring assemblies positioned externally of the peel shaft and connected between the peel and the manipulator carriage to restore the peel to said datum position after such relative movement in either direction of forging, each spring assembly comprising a plurality of springs arranged coaxially within one another and the axes of said springs being substantially parallel to that of said peel, one of said springs in each assembly being mounted to remain uncompressed while the other springs are being compressed until said peel has moved a predetermined distance from said datum position.

2. A manipulator assembly according to claim 1 wherein each spring assembly comprises a rod fast with one of the peel and manipulator carriage and slidable in a housing fast with the other of the peel and manipulator carriage, first and second members each of which is arranged to move with the rod towards the other member in one direction of forging from the datum position but is held against movement in the other direction of forging by the housing, a first spring in compression between said first and second members, third and fourth members slidable on the rod in opposite directions from the datum position and arranged to abut fixed members on the rod, and a second spring held between said third and fourth members so that said second spring remains uncompressed until the peel has moved through the said distance.

References Cited
UNITED STATES PATENTS

| | | | |
|---|---|---|---|
| 1,881,169 | 10/1932 | Brosius | 214—27 |
| 2,257,546 | 9/1941 | Dienenthal et al. | 214—27 |
| 2,864,271 | 12/1958 | Kendall | 214—27 |

GERALD M. FORLENZA, *Primary Examiner.*

FRANK E. WERNER, *Assistant Examiner.*

U.S. Cl. X.R.

214—27